United States Patent [19]

Lo

[11] Patent Number: 5,294,951
[45] Date of Patent: Mar. 15, 1994

[54] DUAL-MODE 3-D AND 2-D CAMERA WITH MOVABLE BAFFLES

[75] Inventor: Allen K. W. Lo, Dunwoody, Ga.

[73] Assignee: Image Technology International, Inc., Norcross, Ga.

[21] Appl. No.: 988,677

[22] Filed: Dec. 10, 1992

[51] Int. Cl.⁵ .................. G03B 35/10; G03B 03/06; G03B 13/10
[52] U.S. Cl. .................. 354/111; 354/114; 354/159; 354/195.12; 354/222
[58] Field of Search ........... 354/114, 115, 116, 195.12, 354/222, 295, 159, 111

[56] References Cited

U.S. PATENT DOCUMENTS

| | | | |
|---|---|---|---|
| D. 264,343 | 5/1982 | Che | D161/7 |
| 2,666,374 | 1/1954 | Roehrig | 354/111 |
| 2,725,804 | 12/1955 | Herzfeld | 354/111 |
| 4,475,798 | 10/1984 | Smith et al. | 354/114 |
| 4,800,407 | 1/1989 | Lo | 354/114 |
| B1 4,800,407 | 8/1990 | Lo | 355/22 |
| 4,903,069 | 2/1990 | Lam | 355/22 |
| 5,111,223 | 5/1992 | Omura | 354/111 |

Primary Examiner—Michael L. Gellner
Assistant Examiner—Jae N. Noh
Attorney, Agent, or Firm—Deveau, Colton & Marquis

[57] ABSTRACT

The present invention relates to a multi-lens camera that can be used for both 3-D photography and 2-D photography. When the camera is used in the 3-D mode, a series of slightly different two-dimensional images of the scene are exposed by all the taking lenses onto the film in the respective film planes in a half-frame format. When the camera is used in the 2-D mode, a wider frame image is exposed onto the film by one of the taking lenses. The negative is exposed in all film planes in the camera when used in the 2-D mode. When the camera is used in the 2-D mode, lens attachments change the angle of view of the taking lens and viewfinder.

12 Claims, 6 Drawing Sheets

DUAL-MODE 3-D AND 2-D CAMERA WITH MOVABLE BAFFLES

BACKGROUND OF THE INVENTION

1. FIELD OF INVENTION

The present invention relates to a camera that can be utilized for three-dimensional (3-D) photography and two-dimensional (2-D) photography.

2. PRIOR ART

In lenticular type three-dimensional (3-D) photography, a plurality of two-dimensional (2-D) views of the scene are taken from a number of horizontally-spaced vantage points and the series of 2-D images is then compressed and printed at the focal plane of each of the lenticules of the lenticular screen to form a 3-D composite image of the field.

In order to take a series of 2-D images at a number of vantage points, one generally takes one of two approaches: 1) using a single-lens camera to take one image at a time at each of the vantage points, or 2) using a multi-lens camera to simultaneously capture a series of 2-D views at one snap. Because the first approach requires special equipment which is usually expensive and bulky, a second approach is more practical for consumer uses.

Multi-lens cameras have been disclosed in a number of U.S. patents which include U.S. Pat. No. 4,800,407 (Lo) where the invention of 3-D cameras with three lenses is disclosed, and U.S. Des. Pat. No. 264,343 (Che) where the invention of 3-D cameras with four lenses is disclosed. Multi-lens cameras are currently available on the market.

The multiple images exposed by a multi-lens camera are a series of regular 2-D images of the same scene photographed at slightly different viewing angles. These regular 2-D images are necessary, as a group, for the composing of a 3-D print but anyone of them can also be used to produce conventional 2-D photographs. Logically, a multi-lens camera should be capable of being utilized as a 3-D camera or as a 2-D camera so that the consumer will not be required to have two cameras, one dedicated to 2-D picture taking and another dedicated to 3-D picture taking. However, all existing consumer 3-D multi-lens cameras adopt a half-frame negative format and this format cannot cover the same field of view normally covered by a full-frame format used in a regular 35mm full-frame camera.

3-D multi-lens cameras are designed to simulate the binocular vision of the human eyes. Therefore, in the design of a consumer 3-D multi-lens camera, the separation between the two endmost lenses must be kept roughly equal to or smaller than the separation distance between the eyes. This lens separation is used in order to assure a good 3-D effect and, at the same time, to avoid excessive parallax which causes a 3-D photograph to become out-of-focus. Since the eye separation distance of the average adult is between 63 and 70mm, the separation between the two endmost lenses in a consumer 3-D multi-lens camera is usually less than or equal to 70mm. This spacing varies depending on the number of lenses on the camera. Furthermore, as all consumer 3-D multi-lens cameras are designed to use a 35mm film, the format for each of the multiple images is about 18mm by 24mm or about half of the regular 35mm full-frame format. Under normal photographic conditions, this relatively narrow format is inadequate for covering the field of view normally covered by a full-frame 2-D camera.

It would be very advantageous for a consumer camera to be capable of exposing multiple images for 3-D photography and also provide a larger image format for 2-D photography. With such a design, the consumer will need only one camera for both 2-D and 3-D picture taking.

SUMMARY OF THE INVENTION

It is the objective of the present invention to produce a camera that can be used for both exposing multiple images for 3-D photography and producing a single full-frame or larger images for 2-D photography. The choice of 3-D mode or 2-D mode is made by the camera user at the time of picture taking.

The camera is constructed with a plurality of identical lenses so that a series of 2-D images are exposed onto the film at a number of horizontally-spaced vantage points at a single snap. These simultaneously exposed images are necessary for producing 3-D composite photographs of the scene. The negative format for the 3-D mode is half-frame, as shown in FIG. 3, approximately half the size of a full-frame image. The same camera can be also used as a 2-D camera where the negative format will be full-frame or larger, as shown in FIG. 6.

When the camera is operating in the 3-D mode, as shown in FIG. 1, a plurality of inner baffles 21 and 23 are set perpendicular to the film plane to separate the frames so that a series of half-frame images are exposed on the film by all the taking lenses.

When the camera is operating in the 2-D mode, as shown in FIG. 4, only one of the taking lenses 12 is used for image exposure while the remaining lenses are blocked off by the baffles 21 and 23 which are now pushed towards the ends of the camera, away from the film plane. In the 2-D mode, only one image is exposed onto a larger frame of the film. It exposes all of the film in all of the film planes behind each lens. The larger frame format allows one to obtain a much broader field coverage of the same scene than when the camera is used in the 3-D mode.

The camera, according to the preferred embodiment of the present invention, is designed to include a lens attachment to change the angle of view of the picture taking lens. This can be attached only to the lens for taking 2-D photographs or to all lenses for taking 3-D photographs. This lens attachment can be used for taking pictures where a panoramic view or telephoto view is desirable. It is preferred that the lens attachment also include a lens positioned over the viewfinder so that the angle of view of the viewfinder matches that of the taking lens/lenses.

The camera, according to the present invention, is suitable for operating in three ways:

1) 3-D mode when the entire roll of film records images in multiples for 3-D printing, 2) 2-D mode when the entire roll of film records images in single frames for 2-D printing, and 3) combination mode in that the same roll of film contains both images in multiples and images in single frame.

Because the camera can be used for taking 3-D and 2-D pictures, the film thus exposed will certainly add confusion to the printing process. A code can be placed on the film so that a photographic printer automatically distinguishes the 3-D negatives from the 2-D negatives and makes proper prints accordingly. An example of such codes is illustrated in FIG. 7.

BRIEF DESCRIPTION OF THE DRAWINGS

FIG. 1b is another sectional view from the top of the camera when it is used in the 3-D mode, showing the cams for controlling the baffles when the baffles are set to separate the image frames as shown in FIG. 1a.

FIG. 4b is a sectional view from the top of the camera when it is used in the 2-D mode, showing the cams having pushed the baffles towards the ends of the camera as shown in FIG. 4a.

DETAILED DESCRIPTION OF THE PREFERRED EMBODIMENTS

Figure 1A:
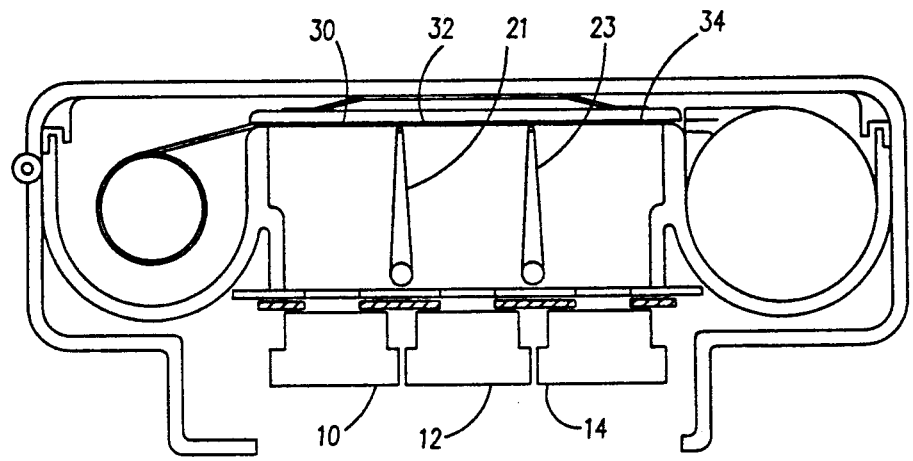
FIG. 1a is a sectional view from the top of the camera when it is used in the 3-D mode, showing the baffles set to separate the image frames.
Figure 1B:
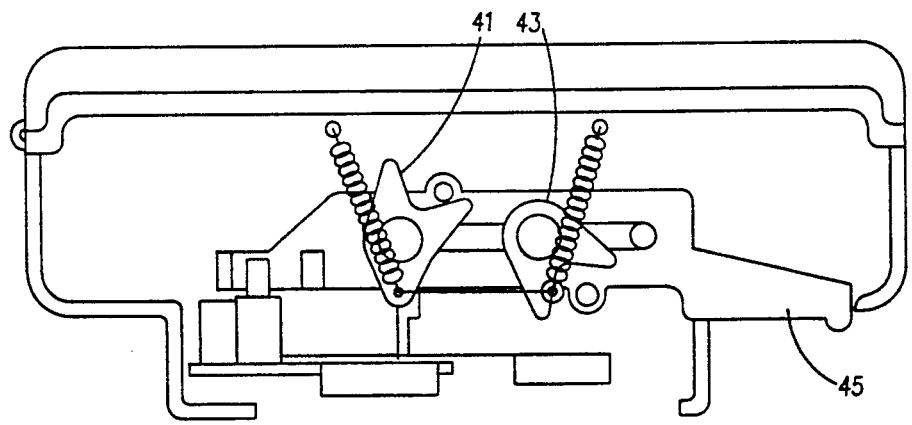

Referring to the drawings, FIG. 1a shows a sectional view of the camera when it is used in the 3-D mode. In FIG. 1a, reference numerals 10, 12, 14 denote the three taking lenses. Reference numerals 21 and 23 are inner baffles which are linked, respectively to cam 41 and cam 43 as shown in FIG 1b. Both cams 41 and 43 are controlled by a common latch 45. Baffle 21 separates the images exposed by lens 10 and lens 12; baffle 23 separates the images exposed by lens 12 and lens 14. In the "3-D" position, these inner baffles are set perpendicular to the film plane, allowing the exposure of three images on frames 30, 32, and 34 through the respective taking lenses 10, 12 and 14.

Figure 2:
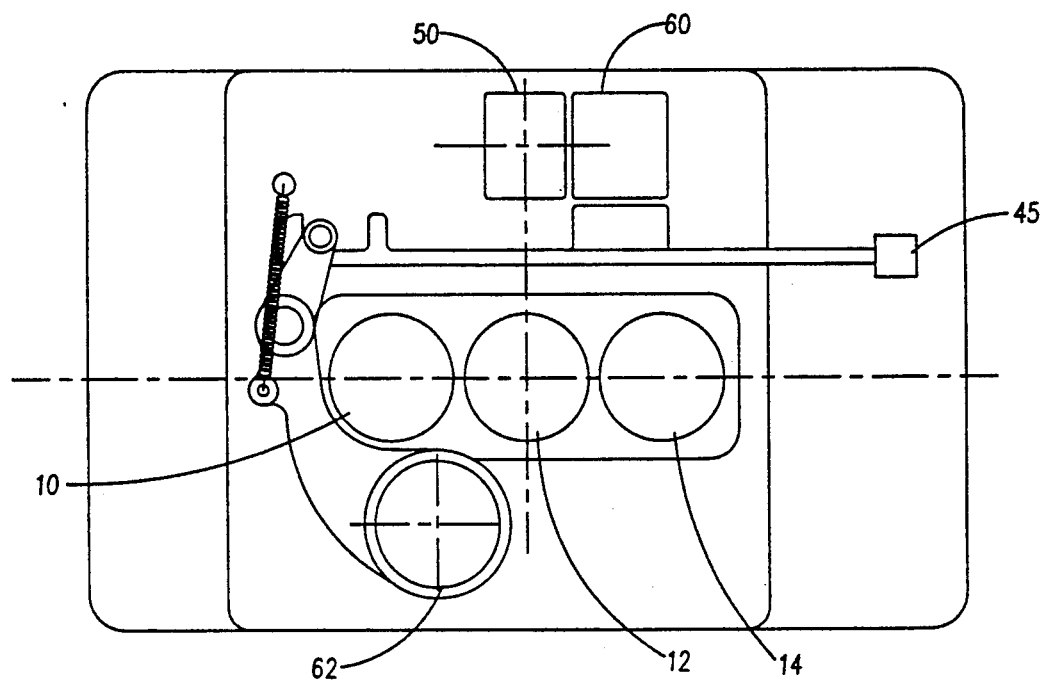
FIG. 2 is the front view of the camera when it is used in the 3-D mode, showing a lens attachment for a lens and the viewfinder in the "off" position.

FIG. 2 is the front view of the camera when it is used in the 3-D mode. In FIG. 2, numerals 10, 12 and 14 denote the three taking lenses. Numeral 45 is the baffle/cam controlling latch. Numeral 50 denotes the viewfinder. Reference numerals 62 and 60 respectively denote the lens attachment for a taking lens and the viewfinder to change the angle of view. These attachments are not used in the 3-D mode in this Figure and, therefore, they are shown to be in the "off" position. It is preferred that this attachment be used to improve the quality of 2-D photographs. However, its incorporation in the camera is optional. The lens attachment (not shown) can also be used in the 3-D mode.

Figure 3:
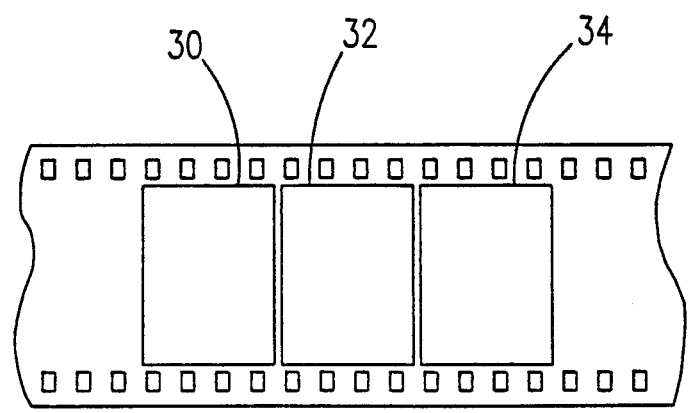
FIG. 3 shows the negative format of the camera when it is used in the 3-D mode.

FIG. 3 shows the negative format of the camera when the camera is used in the 3-D mode. In FIG. 3, three negative frames 30, 32 and 34 are, respectively, corresponding to the taking lenses 10, 12 and 14 shown in FIG. 1. The separations between frames are the result from the inner baffles being engaged in the "3-D" position.

Figure 4A:
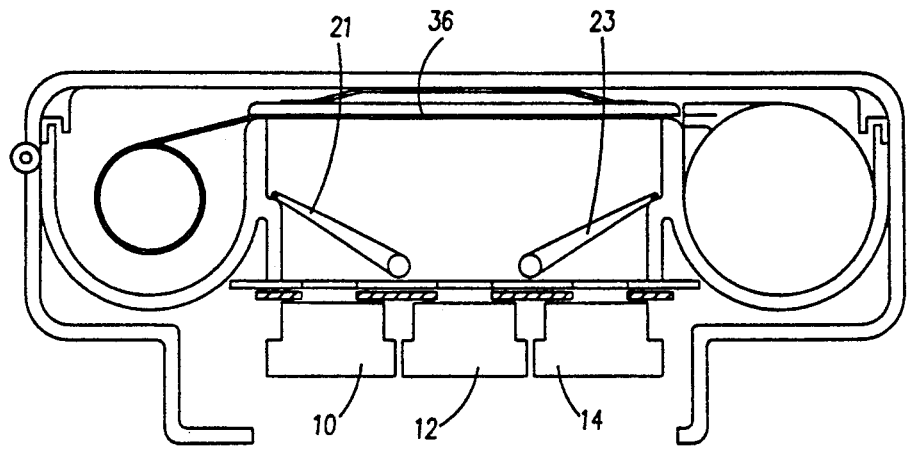
FIG. 4a is a sectional view from the top of the camera when it is used in the 2-D mode, showing the baffles pushed towards the ends of the camera, blocking two side lenses and allowing the center lens to expose an image onto a wider frame of the film.
Figure 4B:
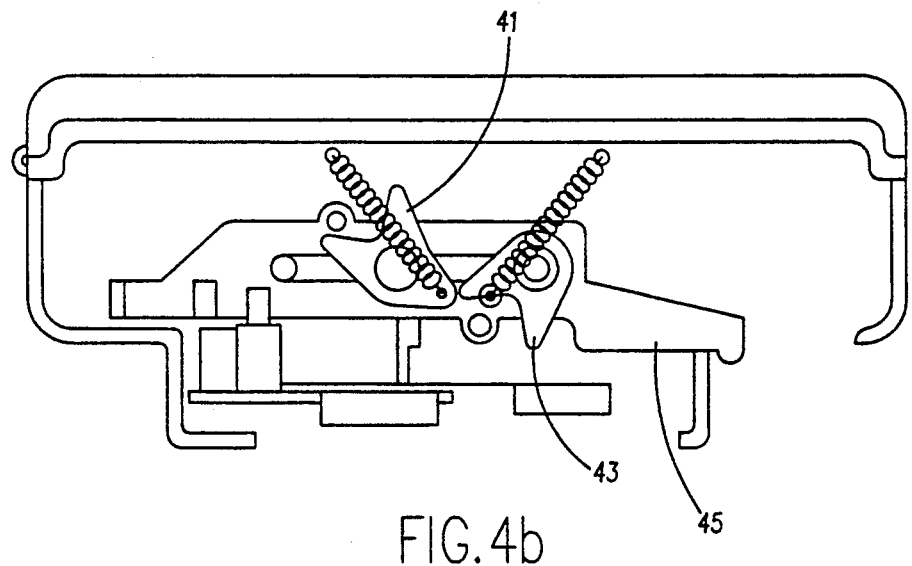

FIG. 4 shows two sectional views of the camera when it is used in the 2-D mode, showing the inner baffles being pushed away from the film plane so that only one taking lens is used to expose an image onto a larger frame of the film. According to the preferred embodiment of the present invention, the taking lens that is used in conjunction with the 2-D mode is the center lens. However, any of the lenses can be used for taking 2-D photographs. In FIG. 4a, numerals 10, 12 and 14 denote the three taking lenses. Reference numerals 21 and 23 denote two inner baffles which are linked, respectively, to cam 41 and cam 43 as shown in FIG. 4b. Both cams 41 and 43 are controlled by a common latch 45. In these figures, the baffles, the cams and the latch are in the "2-D" position. As shown, baffle 21 blocks the light path of taking lens 10, and baffle 23 blocks the light path of taking lens 14 so that light rays entering lenses 10 and 14 do not reach the film plane. With the inner baffles engaged in the "2-D" position, only taking lens 12 is in use for the exposure of an image onto a single frame 36.

Figure 5:
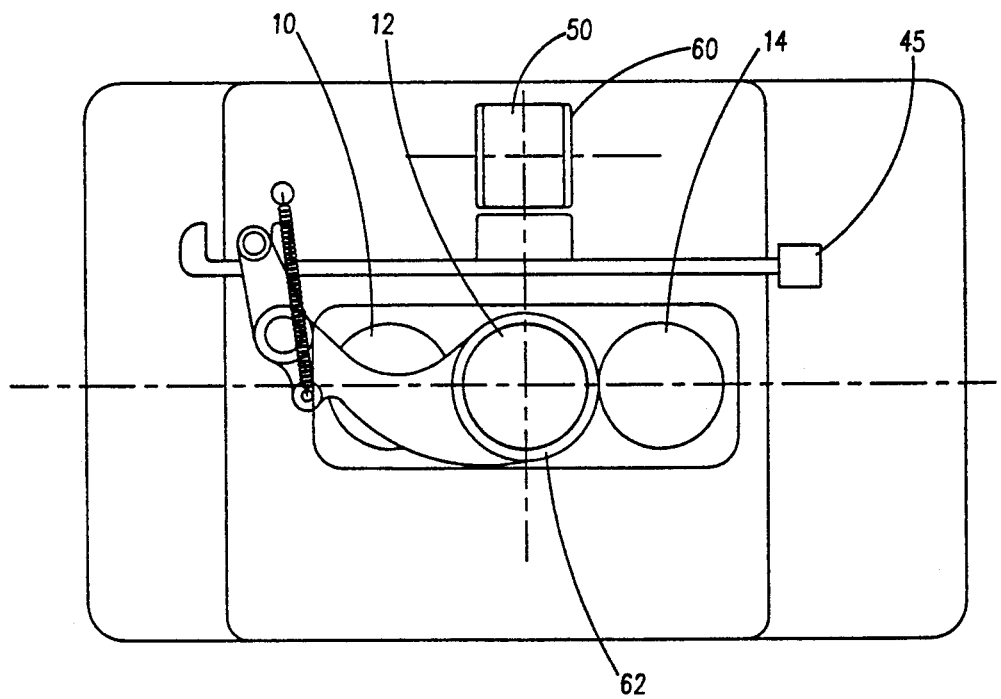
FIG. 5 is the front view of the camera when it is used in the 2-D mode, showing the lens attachment for the lens and viewfinder in the "on" position.

FIG. 5 is the front view of the camera when it is used in the 2-D mode, incorporating a lens attachment for the taking lens and the viewfinder. This attachment is shown in the "on" position. As shown in FIG. 5, lens attachment 62 is now aligned with taking lens 12 and thus increases the angle of coverage by lens 12. At the same time, attachment 60 is aligned with viewfinder 50 so that the angle of view coverage by the viewfinder matches that by the taking lens 12. It should be understood that lenses can be placed in the attachment to accomplish other objectives, such as telescopic, panoramic and microscopic views. The lens attachment can also be used with all lenses when taking pictures in the 3-D mode.

Figure 6:
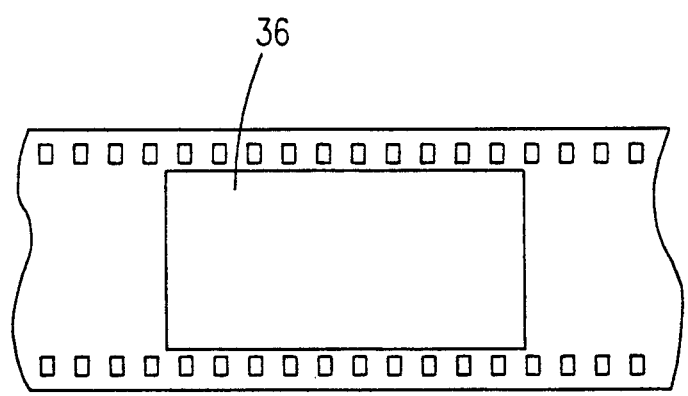
FIG. 6 shows the negative format of the camera when it is used in the 2-D mode, with the lens attachment in either the "on" or "off" position.

FIG. 6 shows the negative format of the camera when the camera is used in the 2-D mode, with the lens attachment either in the "on" or "off" position. In FIG. 6, reference numeral 36 denotes a single negative frame on which an image is exposed by taking lens 12 shown in FIG. 4 and FIG. 5. The negative is exposed in all film planes in the camera when used in the 2-D mode.

Figure 7A:
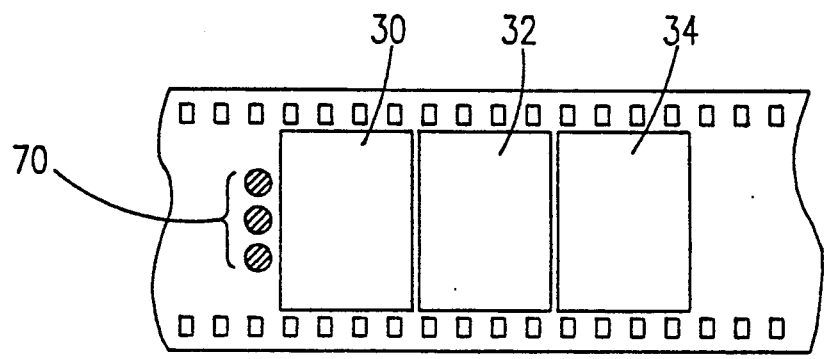
FIG. 7 shows an example of the 3D/2D discriminating codes. The code is generated and exposed onto the film when a picture is taken.
Figure 7B:
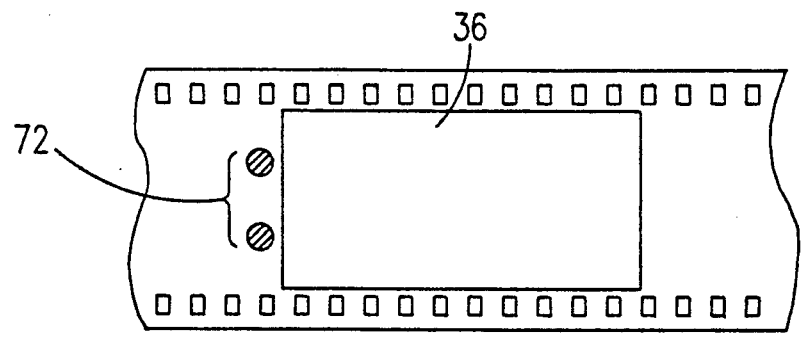

FIG. 7 shows an example of the 3-D/2-D discriminating codes which are used to indicate the negatives are in the "3-D" or the "2-D" format. The codes can be used in conjunction with an automatic photographic printer which makes a 3-D or a 2-D print according to the code on a particular negative. In FIG. 7a, numeral 70 denotes a code for the "3-D" format. In FIG. 7b, numeral 72 denotes a code for the "2-D" format. These codes can be exposed by apertures in the camera which are covered or uncovered by a lever to the common latch 45 that controls the baffles and the lens attachment. A code is described in U.S. Pat. No. 4,903,069 (Lam). When they are exposed onto the film, these codes can be selected by electronic means or mechanical means. When they are used in printing, these codes can be sensed by photosensors.

While the present invention has been described with reference to the preferred embodiment, it shall be understood by those skilled in the art that various changes may be made and equivalents may be substituted for elements thereof without departing from the scope of the invention. For example, in the preferred embodiment shown in FIG. 4, the inner baffles are designed such that the center lens is used to expose a single-frame image when the 2-D mode is selected. It is understood that, however, any one of the lenses can be used for exposure while the remaining lenses are blocked off by the baffles. Also, in the preferred embodiment shown in FIG. 4, three lenses are used for exposing a group of three 2-D images. It is understood that a 3-D camera can be constructed with two taking lenses, four or more taking lenses, and that the baffles will be designed accordingly so that only one taking lens is used for taking 2-D pictures. Furthermore, the lens attachment and the viewfinder attachment, according to the preferred embodiment, are used for changing an angle of view. It is understood that similar attachments can be used so that tele-photos or special effect photographs can be taken with the same camera in both the 2-D and 3-D modes.

Therefore, it is intended that the present invention shall include embodiments falling within the scope of the appended claims:

What is claimed is:

1. A camera for taking both two-dimensional and three-dimensional pictures, comprising a plurality of picture-taking lenses, a film plane behind each lens, a moveable light barrier baffle positioned when taking three-dimensional pictures so as to prevent the light entering one lens from exposing the film in the film plane behind any of the other lenses, means for moving the baffle into position to block light from entering all lenses except one so that light entering such lens exposes the film in the film planes behind all of the lenses in order to take a wider two-dimensional picture.

2. The camera of claim 1 which also has a moveable lens attachment in which said lens can be moved into position over the picture-taking lens in which the light entering the picture-taking lens is not blocked in order to change the angle of view of the picture-taking lens for use in taking a single two-dimensional picture.

3. The camera of claim 2 which also includes a viewfinder.

4. The camera of claim 2 in which the lens attachment also has a lens to change the angle of view of the viewfinder to be the same as the lens attachment in position over the picture-taking lens.

5. The camera of claim 1 which also has a moveable attachment of lenses in which said lenses can be moved into position over all picture-taking lenses in order to change the angle of view of the picture-taking lenses for use in taking three-dimensional pictures.

6. The camera of claim 1 in which the moveable baffles are perpendicular to the film plane and each baffle has two ends, one end which is adjacent to the picture-taking lens and the other end is near the film plane when taking a three-dimensional photograph, and in which the means for moving the baffles when changing between two-dimensional and three-dimensional photography consists of a pivot at the end of each baffle adjacent a picture-taking lens and a lever connecting each baffle for moving the baffle.

7. The camera of claim 6 which also has a moveable lens attachment and in which said lens can be moved into position over the picture-taking lens in which the light entering the picture-taking lens is not blocked in order to change the angle of view for use in taking a single two-dimensional picture.

8. The camera of claim 7 in which the baffles and lens attachments are moved by the same lever.

9. The camera of claim 8 which also has a viewfinder.

10. The camera of claim 9 in which the lens attachment also has a lens to change the angle of view of the viewfinder to be the same as the picture-taking lens with the lens attachment in position over the picture-taking lens.

11. The camera of claim 1 which also has means for generating a code on the exposed film to indicate whether the camera was in the three-dimensional or two-dimensional mode when the film was exposed, said code being readable so the printer can be adjusted to print in the proper mode.

12. The camera of claim 11 in which the code is readable by a photographic printer.

* * * * *